US008345326B2

(12) United States Patent
Kitagaki et al.

(10) Patent No.: US 8,345,326 B2

(45) Date of Patent: Jan. 1, 2013

(54) BILL PROCESSING MACHINE

(75) Inventors: Noriaki Kitagaki, Osaka (JP); Akio Funato, Kyoto (JP)

(73) Assignee: Laurel Machinery Co., Ltd., Osaka (JP)

( * ) Notice: Subject to any disclaimer, the term of this patent is extended or adjusted under 35 U.S.C. 154(b) by 451 days.

(21) Appl. No.: 12/686,546

(22) Filed: Jan. 13, 2010

(65) Prior Publication Data

US 2010/0182657 A1 Jul. 22, 2010

(30) Foreign Application Priority Data

Jan. 16, 2009 (JP) ................................ P2009-007685

(51) Int. Cl.
*H04N 1/04* (2006.01)

(52) U.S. Cl. ........ 358/475; 358/509; 358/497; 194/207; 235/379; 382/135; 271/177

(58) Field of Classification Search .................. 358/498, 358/475, 509, 497, 496; 194/207, 206, 318, 194/250; 235/379; 382/135, 136; 271/177, 271/176, 207

See application file for complete search history.

(56) References Cited

U.S. PATENT DOCUMENTS

| | | | | |
|---|---|---|---|---|
| 5,498,879 | A | 3/1996 | De Man | |
| 6,050,386 | A * | 4/2000 | Niizuma | 194/206 |
| 6,101,266 | A | 8/2000 | Laskowski et al. | |
| 6,605,819 | B2 | 8/2003 | Ross | |
| 6,891,180 | B2 | 5/2005 | Holl et al. | |
| 7,084,416 | B2 | 8/2006 | Suzuki | |

(Continued)

FOREIGN PATENT DOCUMENTS

EP 1 321 903 6/2003

(Continued)

OTHER PUBLICATIONS

European Search Report dated Oct. 15, 2010 issued in European Patent Application No. 10150748.1, 4 pp.

(Continued)

*Primary Examiner* — Negussie Worku

(74) *Attorney, Agent, or Firm* — Nixon & Vanderhye P.C.

(57) ABSTRACT

A bill processing machine according to the present invention includes an element array portion and a light guiding member. The element array portion is arranged so as to face one side of a conveyance path of a bill, and includes a light receiving element group, a light emitting element and an other side light receiving element. The light receiving element group includes a plurality of light receiving elements, and an arrangement direction of the light receiving elements is perpendicular to a conveyance direction of a bill. The light emitting element is arranged on one side of the arrangement direction of the light receiving elements. The other side light receiving element is arranged on an other side of the arrangement direction of the light receiving elements. The light guiding member is arranged opposite to the element array portion with respect to the conveyance path so that the light guiding member and the element array portion sandwiches the conveyance path therebetween. The light guiding member includes a first refracting portion, a second refracting portion and a main body portion. The first refracting portion refracts irradiated light of the light emitting element in a direction parallel to the arrangement direction. The second refracting portion refracting the irradiated light refracted by the first refracting portion toward the other side light receiving element The main body portion diffuses in an approximately uniform manner the irradiated light refracted by the first refracting portion toward the light receiving element group.

8 Claims, 9 Drawing Sheets

U.S. PATENT DOCUMENTS

| | | | | |
|---|---|---|---|---|
| 7,170,074 | B2 * | 1/2007 | Baudat | 250/556 |
| 7,269,279 | B2 * | 9/2007 | Chiles | 382/135 |
| 7,359,543 | B2 | 4/2008 | Tsuji et al. | |
| 7,455,183 | B2 * | 11/2008 | Nishida et al. | 209/534 |
| 7,487,874 | B2 * | 2/2009 | Nishida et al. | 209/534 |
| 7,551,764 | B2 * | 6/2009 | Chiles et al. | 382/135 |
| 7,584,890 | B2 | 9/2009 | Mazowiesky et al. | |
| 7,607,662 | B2 * | 10/2009 | Nireki | 271/270 |
| 7,639,404 | B2 * | 12/2009 | Ikeno et al. | 358/461 |
| 8,194,236 | B2 * | 6/2012 | Fujimoto et al. | 356/71 |
| 8,260,027 | B2 * | 9/2012 | Nireki | 382/135 |
| 2001/0030100 | A1 | 10/2001 | Negishi | |
| 2004/0125358 | A1 | 7/2004 | Numata | |
| 2004/0211904 | A1 | 10/2004 | Scowen et al. | |
| 2007/0108013 | A1 | 5/2007 | Nago et al. | |
| 2007/0295812 | A1 | 12/2007 | Mazowiesky et al. | |
| 2009/0022390 | A1 | 1/2009 | Yacoubian et al. | |

FOREIGN PATENT DOCUMENTS

| | | |
|---|---|---|
| EP | 1 482 457 | 12/2004 |
| EP | 1 587 030 | 10/2005 |
| EP | 1 892 679 | 2/2008 |
| GB | 2 075 669 | 11/1981 |
| GB | 2 366 371 | 3/2002 |
| JP | 56-16287 | 2/1981 |
| JP | 56-161507 | 12/1981 |
| JP | 08-180236 | 7/1996 |
| JP | 10-031775 | 2/1998 |
| JP | 2004-355261 | 12/2004 |
| JP | 2004-355264 | 12/2004 |
| KR | 10-2008-0049597 | 6/2008 |

OTHER PUBLICATIONS

Notice of Allowance mailed Oct. 31, 2011 in Korean Patent Application No. 10-2010-0002787 with English translation, 3 pp.

Notice of Allowance mailed Apr. 30, 2012 in Korean Patent Application No. 10-2010-0002788, 3 pp.

Office Action dated Sep. 15, 2010 issued in U.S. Appl. No. 12/685,747, 7 pp.

Office Action dated Mar. 15, 2011 issued in U.S. Appl. No. 12/685,747, 10 pp.

Notice of Allowance dated Apr. 30, 2012 issued in Korean Patent Application No. 10-2010-0002778, 3 pp.

* cited by examiner

BILL PROCESSING MACHINE

BACKGROUND OF THE INVENTION

1. Field of the Invention

The present invention relates to a bill processing machine.

Priority is claimed on Japanese Patent Application No. 2009-007685, filed Jan. 16, 2009, the content of which is incorporated herein by reference.

2. Description of Related Art

There is a bill counting machine which includes a bill detection sensor which detects a bill being conveyed, and a width sensor which detects end positions of a bill being conveyed in the width direction (i.e., in a direction perpendicular to the transporting direction of the bill). The bill counting machine counts bills and checks the conveyance state of bills and confirms denominations of bills by the bill detection sensor and the width sensor (for example, refer to Japanese Unexamined Patent Application, First Publication No. S56-16287 and Japanese Unexamined Utility Model Application, First Publication No. S56-161507).

In both the bill detection sensor and the width sensor, a light emitting element and a light receiving element are arranged sandwiching a conveyance path therebetween, and the bill counting machine detects a bill in response to the light receiving element being prevented from receiving light of the light emitting element by the bill being conveyed in the conveyance path. Therefore, there arise problems as follows. A plurality of sets of a light emitting element and a light receiving element are required. Wiring and the like for driving the light emitting element and the light receiving element are required to be provided on both sides with respect to a conveyance path of a bill, and thus the wiring structure is complicated and the cost and size of the machine increase.

SUMMARY OF THE INVENTION

An object of the present invention is to provide a bill processing machine which achieves simplification, cost reduction and space reduction.

A bill processing machine according to the present invention includes an element array portion and a light guiding member. The element array portion is arranged so as to face one side of a conveyance path of a bill, and includes a light receiving element group, a light emitting element and an other side light receiving element. The light receiving element group includes a plurality of light receiving elements, and an arrangement direction of the light receiving elements is perpendicular to a conveyance direction of a bill. The light emitting element is arranged on one side of the arrangement direction of the light receiving elements. The other side light receiving element is arranged on an other side of the arrangement direction of the light receiving elements. The light guiding member is arranged opposite to the element array portion with respect to the conveyance path so that the light guiding member and the element array portion sandwiches the conveyance path therebetween. The light guiding member includes a first refracting portion, a second refracting portion and a main body portion. The first refracting portion refracts irradiated light of the light emitting element in a direction parallel to the arrangement direction. The second refracting portion refracting the irradiated light refracted by the first refracting portion toward the other side light receiving element. The main body portion diffuses in an approximately uniform manner the irradiated light refracted by the first refracting portion toward the light receiving element group.

With this structure, the element array portion is arranged so as to face one side of a conveyance path of a bill, and the light guiding member is arranged opposite to the element array portion with respect to the conveyance path so that the light guiding member and the element array portion sandwiches the conveyance path therebetween. When the light emitting element of the element array portion irradiates light, the first refracting portion of the light guiding member refracts the irradiated light in a direction parallel to the arrangement direction of the light receiving elements of the light receiving element group, and the main body portion diffuses the light in an approximately uniform manner toward the light receiving element group, and so it is possible to detect the end portion position in the width direction of the bill by the ON/OFF of the plurality of light receiving elements included in the light receiving element group. Also, the second refracting portion of the light guiding member refracts the irradiated light that is refracted by the first refracting portion toward the other side light receiving element, and so it is possible to detect whether or not a bill exists by the ON/OFF of the other side light receiving element. Therefore, the light emitting element and the light guiding member become a common light source with respect to the plurality of light receiving elements of the light receiving element group and the other side light receiving element. Accordingly, since the light source for the plurality of light receiving elements is constituted by one light emitting element and light guiding member, it is possible to achieve simplification, cost reduction and space reduction. Moreover, since the light receiving element group, the light emitting element and the other side light receiving element are arranged in the element array portion provided on one side of the conveyance path of the bill, the wiring and the like for driving them are gathered together on one side of the conveyance path. Therefore, the wiring and the like for driving them are eliminated on the opposite side of the conveyance path. Accordingly, from this point as well, it is possible to achieve simplification, cost reduction and space reduction.

The bill processing machine according to present invention may further include two sets of a detecting mechanism. Each of the two sets of the detecting mechanism may include the element array portion and the light guiding member that are mutually opposed. The two sets of the detecting mechanism may be arranged in the arrangement direction so that the other side light receiving elements of the two sets of the detecting mechanism are arranged close to each other.

With this structure, it is possible to detect the one end position in the width direction of the bill by the light receiving element group of the one of the two sets of the detecting mechanism, and detect the other end position in the width direction of the bill by the light receiving element group of the other of the two sets of the detecting mechanism. Accordingly, it is possible to detect both end positions in the width direction of the bill, and it is possible to perform a check of the conveyance state and a denomination confirmation and the like.

In the bill processing machine according to the present invention, in the two sets of the detecting mechanism, the element array portions of the two sets of the detecting mechanism may be arranged on same one side with respect to the conveyance path, and the light guiding members of the two sets of the detecting mechanism may be arranged on same other side with respect to the conveyance path.

With this structure, since in the two sets of the detecting mechanism, the element array portions of the two sets of the detecting mechanism are arranged on same one side with respect to the conveyance path, the wiring and the like for driving the light receiving element group, the light emitting element and the other side light receiving element of the two sets of the detecting mechanism are gathered together on one side of the conveyance path. Therefore, the wiring for driving them is eliminated on the opposite side of the conveyance path. Accordingly, simplification, cost reduction and space reduction are achieved.

The bill processing machine according to the present invention may further include a control portion which detects an end potion of a bill based on a detection result of the light receiving element group, and judges whether or not a bill exists based on a detection result of the other side light receiving element.

With this structure, the control portion detects an end potion of a bill based on a detection result of the light receiving element group, and judges whether or not a bill exists based on a detection result of the other side light receiving element. Therefore, it is possible to judge the existence of the bill and the end portion position.

The bill processing machine according to the present invention may further include a control portion which counts a bill based on a detection result of whether or not a bill exists obtained by at least either one of the other side light receiving elements of the two sets of the detection mechanism, and judges a width of a bill and a denomination of the bill based on a detection result of end portions of the bill obtained by both of the light receiving element groups of the two sets of the detection mechanism.

With this structure, the control portion counts a bill based on a detection result of whether or not a bill exists obtained by at least either one of the other side light receiving elements of the two sets of the detection mechanism, and judges a width of a bill and a denomination of the bill based on a detection result of end portions of the bill obtained by both of the light receiving element groups of the two sets of the detection mechanism. Therefore, it is possible to judge the existence, width and denomination of the bill.

DETAILED DESCRIPTION OF THE INVENTION

The bill processing machine according to one embodiment of the present invention shall be described with reference to the drawings.

Figure 1:
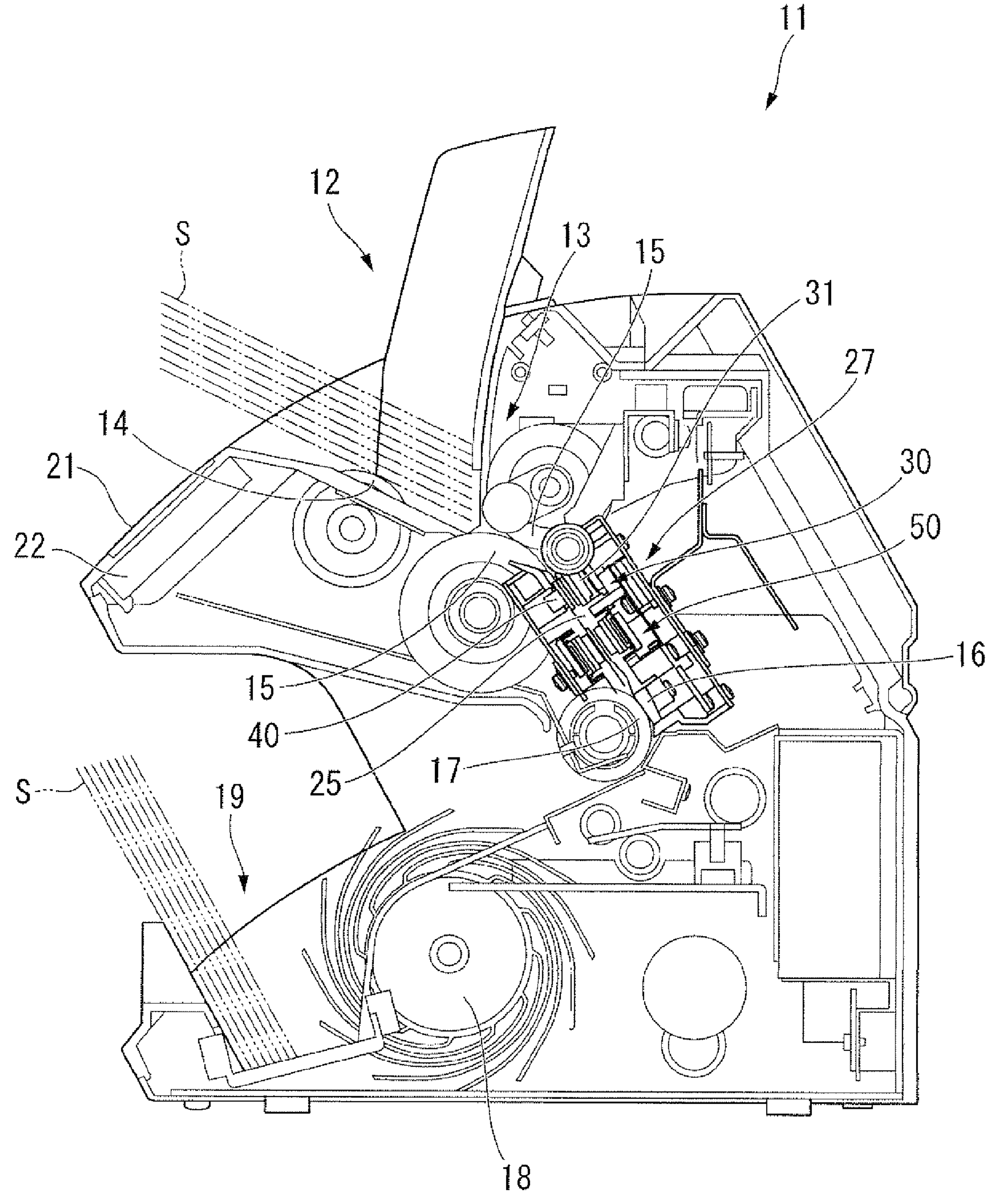
FIG. 1 is a cross-sectional view that shows a bill processing machine according to one embodiment of the present invention.

FIG. 1 is a cross-sectional view that shows a desktop-type bill processing machine 11 according to the present embodiment.

As shown in FIG. 1, a bill processing machine 11 is provided with a loading portion 12 on the front face side of the upper portion of the machine body (i.e., the bill processing machine 11). A plurality of bills S are loaded in the loading portion 12 in the state of the bills being stacked in the vertical direction with their lengthwise direction being made the horizontal direction of the machine body. A feeding mechanism 13 is provided at the lower portion of the loading portion 12. The feeding mechanism 13 separates the bills S one by one and feeds them into the machine. The feeding mechanism 13 feeds the bill S that is kicked out by a kickout roller 14 in a downwardly rearward direction from between a pair of feeding rollers 15 and 15, and sends the bill S in between a guide member 16 and a guide roller 17. The guide member 16 and the guide roller 17 are provided diagonally below the feeding mechanism 13. The guide roller 17 sends out in a downwardly forward direction the bill S that is sent in, and delivers it to an accumulation wheel 18 that is to the front thereof. An accumulation portion 19 is disposed on the front face side of the lower portion of the machine body. The collection wheel 18 feeds the delivered bill S to the accumulation portion 19, and causes the bills to be accumulated in the front-rear direction of the machine body so as to be removable to the outside of the machine. The bill processing machine 11 includes a display operation portion 21 and a control portion 22. The display operation portion 21 and the control portion 22 are provided further to the front face side of the machine body than the bill loading portion 12. The display operation portion 21 performs display for the operator, and receives operation input from the operator. The control portion 22 controls the bill processing machine 11.

A conveyance path 25 is formed that links the position between the pair of feeding rollers 15 and 15 and the position between the guide member 16 and the guide roller 17. The conveyance path 25 conveys the bill S. This conveyance path 25 is disposed in an identifying portion 27 for identifying the bills that are being conveyed in the conveyance path 25. The conveyance path 25 conveys the bills S in a downwardly rearward direction in an orientation in which the lengthwise direction (width direction) thereof is aligned with the horizontal direction of the machine body.

A start operation is input to the display operation portion 21 with the bills S loaded in an accumulated state in the loading portion 12. With this input, the control portion 22 drives the feeding mechanism 13, the guide roller 17 and the accumulation wheel 18, and while identifying and counting the bills S of the loading portion 12 one at a time in turn with the identifying portion 27, causes them to be accumulated in the accumulation portion 19. When it is detected by a sensor, not illustrated, that there are no longer any bills S in the loading portion 12, the control portion 22 stops the driving of the feeding mechanism 13, the guide roller 17 and the accumulation wheel 18 at the timing of the last bill S reaching the accumulation portion 19, and causes the display operation portion 21 to display the identification result of the identifying portion 27.

Figure 2:
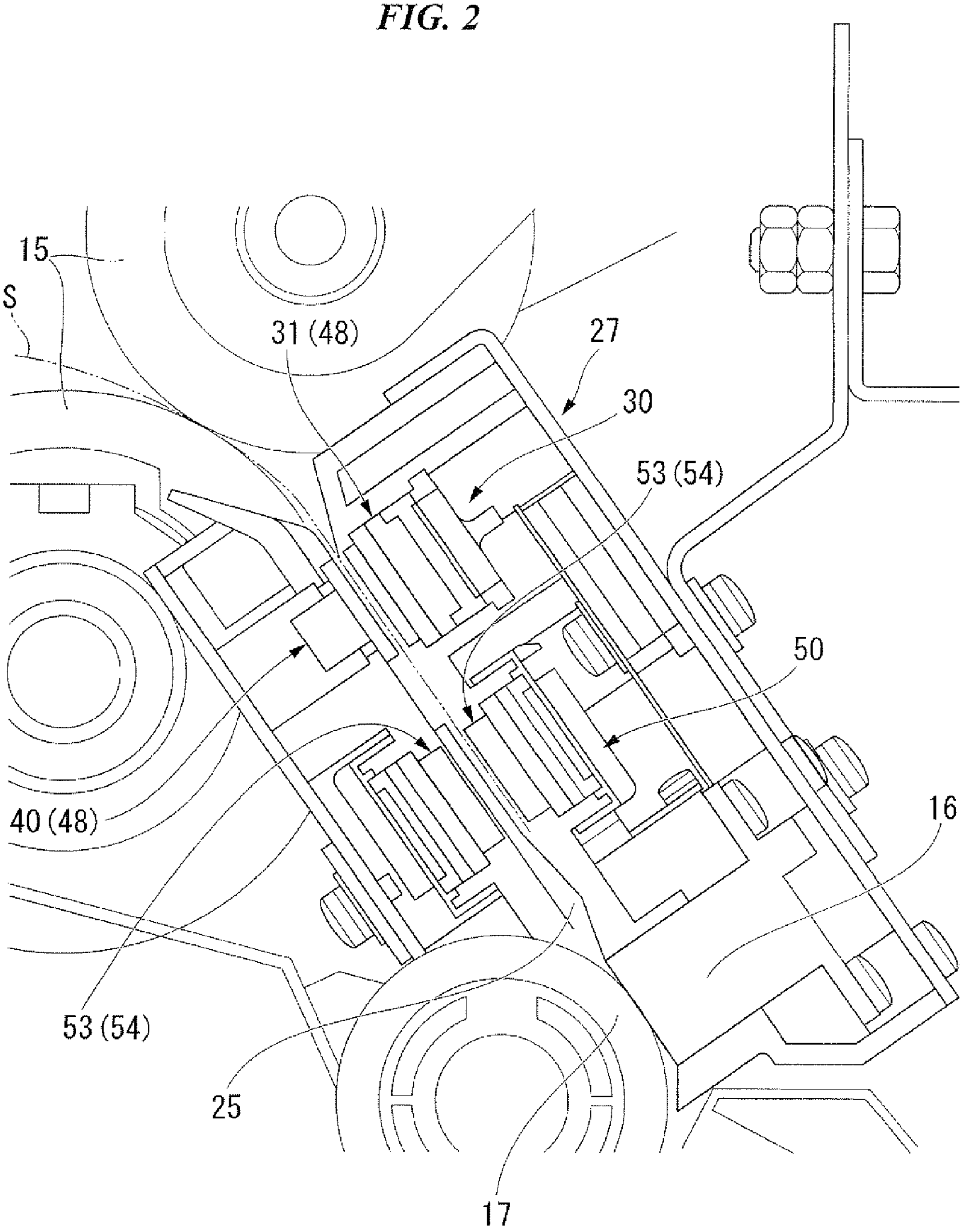
FIG. 2 is an enlarged cross-sectional view that shows an identifying portion of the bill processing machine according to the embodiment of the present invention.
Figure 3:
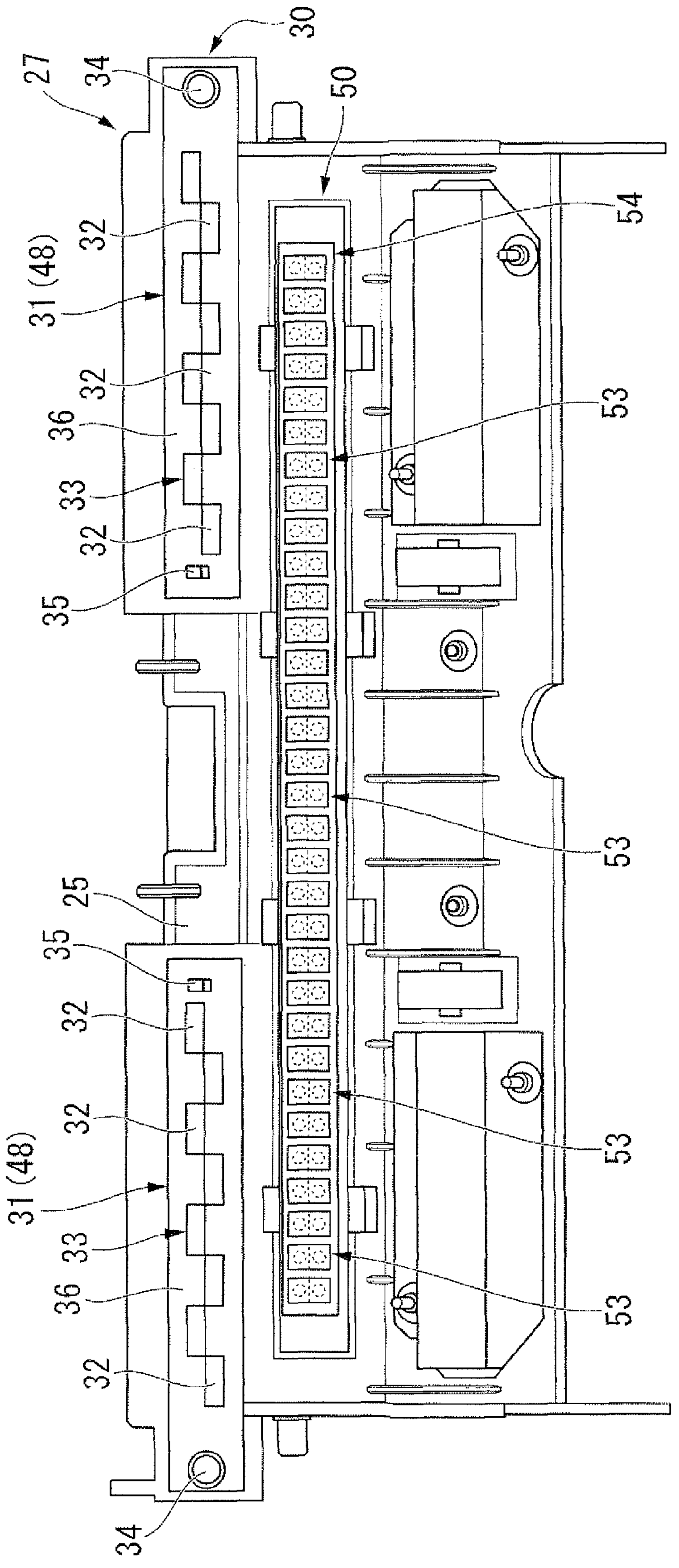
FIG. 3 is a front view that shows one side of the identifying portion of the bill processing machine according to the embodiment of the present invention.

As shown in FIG. 2, a bill detector 30 is provided on the upstream side of the identifying portion 27. A pair of element array portions 31 are provided spaced apart on both sides in the horizontal direction of the machine body as shown in FIG. 3. The pair of element array portions 31 are arranged so as to face one side of the conveyance path 25 as shown in FIG. 2. In other words, the pair of element array portions 31 are arranged so as to face one side in the thickness direction of the bill S that is being conveyed in the conveyance path 25. These element array portions 31 have a rectangular shape as shown in FIG. 3, and are arranged on the same straight line that is perpendicular to the conveying direction of the bills S and runs along the horizontal direction of the machine body.

Figure 4:
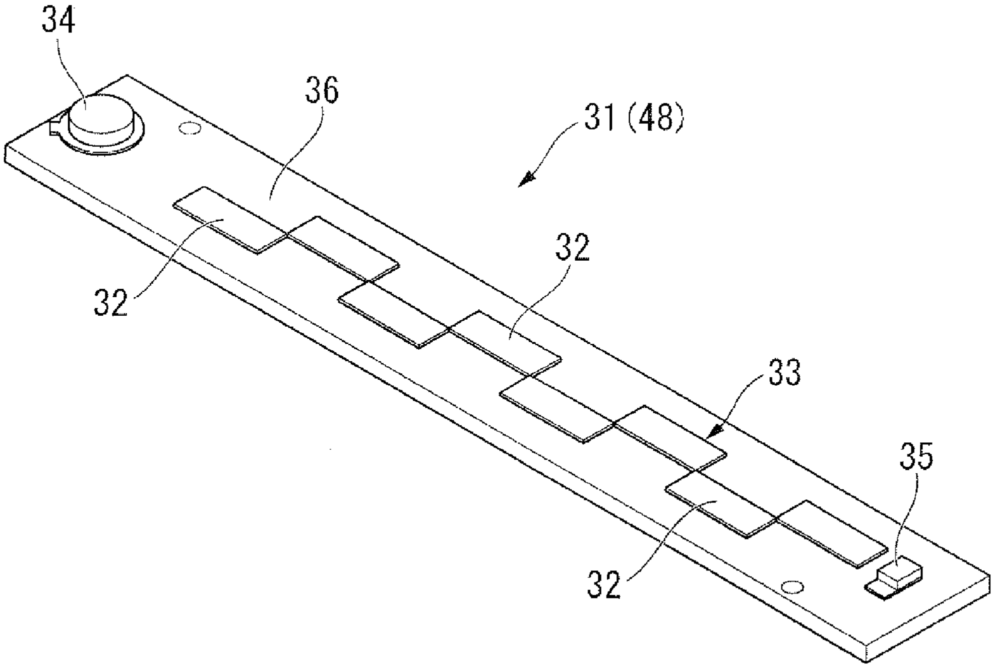
FIG. 4 is a perspective view that shows an element array portion of the bill processing machine according to the embodiment of the present invention.

Each element array portion 31 includes a light receiving element group 33, a light emitting element 34, an other side light receiving element 35, and a common substrate 36 to which the light receiving element group 33, the light emitting element 34, and the other side light receiving element 35 are attached. The light receiving element group 33 is arranged in the horizontal direction of the machine body, which is the lengthwise direction of the element array portion 31, and includes a plurality of, specifically eight, light receiving elements 32 such as photodiodes. The light emitting element 34 is arranged on one side in the horizontal direction of the machine body that is the arrangement direction of the light receiving elements 32 of the light receiving element group 33. The other side light receiving element 35 includes a photo transistor or the like that is disposed on the other side in the horizontal direction of the machine body of the light receiving element group 33. As also shown in FIG. 4, the light receiving elements 32 of the light receiving element group 33 are arranged in a staggered manner. Also, the light emitting element 34 and the other side light receiving element 35 are disposed so as to sandwich the entirety of the light receiving element group 33 from the horizontal direction of the machine body. The light receiving elements 32 are disposed so as to be alternately frontward and rearward with respect to the conveying direction of the bill S.

There are two element array portions 31 of the same structure, as shown in FIG. 3, and they are lined up in the horizontal direction of the machine body in the state of each other's other side light receiving element 35 being arranged on the proximal side. That is, the two element array portions 31 are arranged in the arrangement direction of the light receiving elements 32 line so that the other side light receiving elements 35 of the two element array portions 31 are arranged close to each other. Phases of the element array portions 31 are mutually reversed. That is, in the element array portion 31 on the first side in the arrangement direction of the light receiving elements 32, the light receiving element 32 closest to the other side light receiving unit 35 is disposed on an upper side, and the light receiving element 32 farthest to the other side light receiving unit 35 is disposed on a lower side. On the other hand, in the element array portion 31 on the second side in the arrangement direction of the light receiving elements 32, the light receiving element 32 closest to the other side light receiving unit 35 is disposed on the lower side, and the light receiving element 32 farthest to the other side light receiving unit 35 is disposed on the upper side.

The bill detector 30 includes light guiding members 40. The light guiding members 40 are respectively positioned at the opposite side to the element array portions 31 with respect to the conveyance path 25, as shown in FIG. 2. That is, the conveyance path 25 is sandwiched between the light guiding members 40 and the element array portions 31. The light guiding members 40 is arranged so as to face the other side of the conveyance path 25. These light guiding members 40 form a straight line, and are arranged on the same straight line along the horizontal direction of the machine body.

Figure 5:
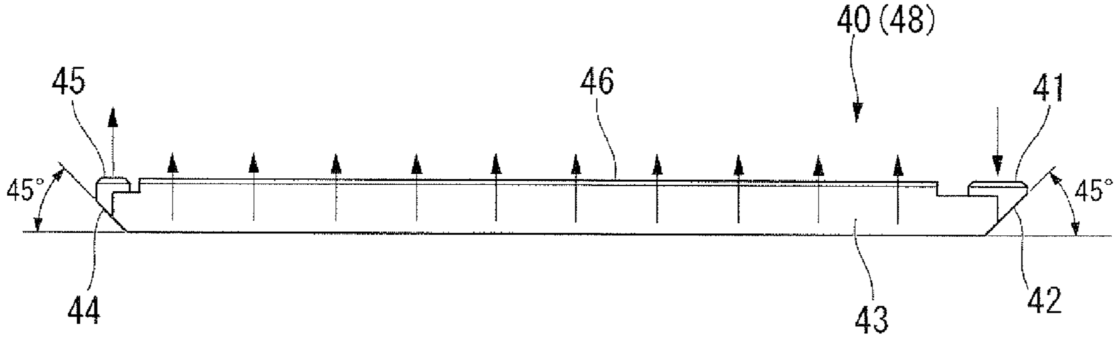
FIG. 5 is a plan view that shows a light guiding member of the bill processing machine according to the embodiment of the present invention.
Figure 6:
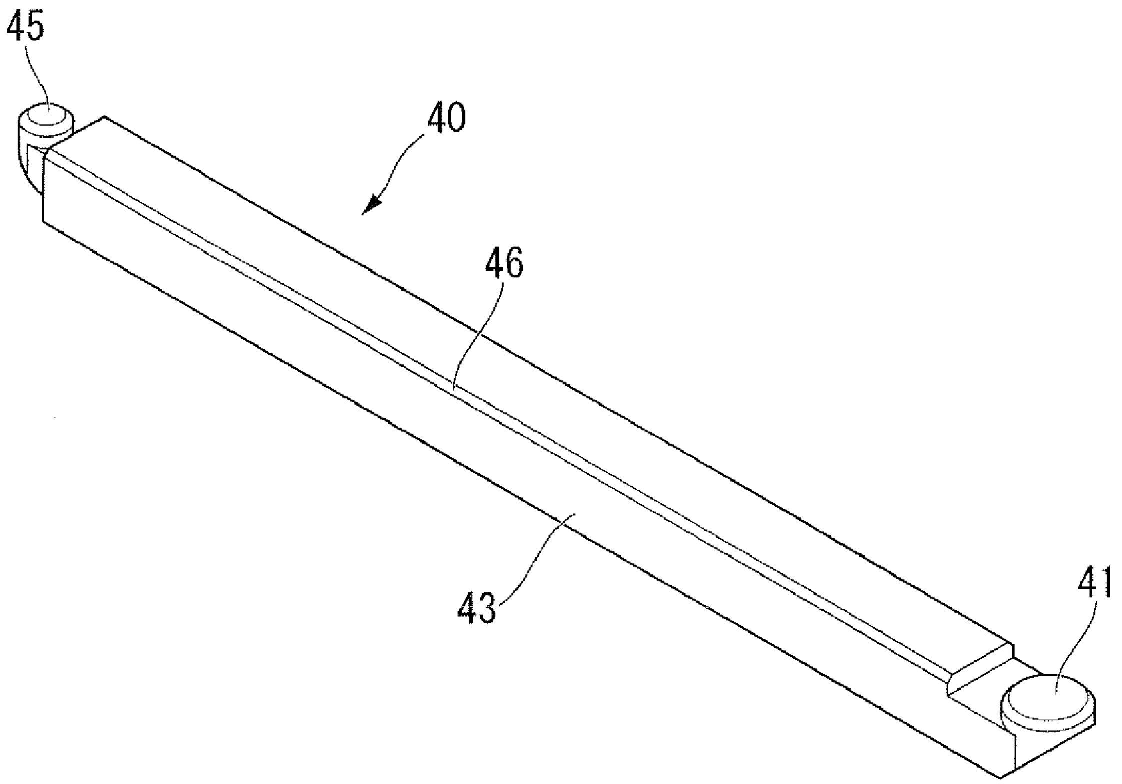
FIG. 6 is a perspective view that shows the light guiding member of the bill processing machine according to the embodiment of the present invention.

The light guiding member 40 that is shown in FIG. 5 and FIG. 6 may be a prism that is formed with acrylic resin that is a transparent material as a primary raw material.

The light guiding member 40 includes light lead-in portion 41, a first refracting portion 42, a main body portion 43, a second refracting portion 44, and an end portion light lead-out portion 45. The light lead-in portion 41 faces the light emitting element 34 of the element array portion 31, and thus the light from this light emitting element 34 is introduced. The first refracting portion 42 refracts the light of the light emitting element 34 that is introduced from the light lead-in portion 41 in a direction parallel to the horizontal direction of the machine body that is the lengthwise direction of the light guiding member 43. The main body portion 43 passes the irradiated light that is refracted by the first refracting portion 42. The second refracting portion 44 refracts toward the other side light receiving element 35 the irradiated light that was refracted by the first refracting portion 42 and led by the main body portion 43. The end portion light lead-out portion 45 faces the other side light receiving element 35 and irradiates the irradiated light that was refracted by the second refracting portion 44 to the other side light receiving element 35. The main body portion 43 faces the plurality of light receiving elements 32 of the light receiving element group 33 of the element array portion 31. The main body portion 43 diffuses in an approximately uniform manner the irradiated light of the light emitting element 34 that was refracted by the first refracting portion 42 towards each light receiving element 32 of the light receiving element group 33 with an internal light reflecting layer that is not illustrated. That is, the light guiding member 40 irradiates light of one light emitting element 34 of the element array portion 31 via the conveyance path 25 toward the plurality of light receiving elements 32 of the light receiving element group 33 and the other side light receiving element 35.

The main body portion 43 has a square pillar shape. The light lead-in portion 41 and the end portion light lead-out portion 45 have an approximately circular column shape that is perpendicular to the lengthwise direction of the main body portion 43 and project in the same direction from the main body portion 43. The first refracting portion 42 has a planar shape that is cut 45° to the main body portion 43 and the light lead-in portion 41. The second refracting portion 44 has a planar shape that is cut 45° to the main body portion 43 and the end portion light lead-out portion 45. A chamfer 46 is formed on both end edge portions on the side facing the element array portion 31 of the main body portion 43.

In the bill detector 30 that is constituted as described above, two sets of a detecting mechanism 48 that includes the element array portion 31 and the light guiding member 40 that are mutually opposed are arranged on both sides in the width direction (lengthwise direction) of the bill S conveyed in the conveyance path 25. In this bill detector 30, each of the two sets of detecting mechanisms 48 have the mutual element array portions 31 arranged on the same one side (the one side in the thickness direction of the bill S) and the mutual light guiding members 40 arranged on the same reverse side (the reverse side in the thickness direction of the bill S) with respect to the conveyance path 25. In the conveyance path 25, in order to remove a bill that has jammed, opening/closing and swinging of the front face side of the machine body are possible. Both the light guiding members 40 are arranged at the machine body unit portion on this opening/closing and swinging side. Both element array portions 31 are arranged at the machine body unit portion on the non-opening/closing side (non swinging side). Thereby, the bill detector 30 eliminates wiring at the machine body unit portion on the opening/closing and swinging side, and concentrates the wiring at the machine body unit portion on the non-swinging side.

When the bills S that are separated and fed one at a time by the feeding mechanism 13 pass the bill detector 30, the light receiving state of either one of the other side light receiving elements 35 of the two sets of detecting mechanisms 48 changes from there being received light to there not being received light. When there is a change in the light receiving state from light being received to light not being received, the control portion 22 detects the change from the bill S not being present to being present, and thereby counts the number of bills S. Also, when the light receiving state of the light receiving element 32 of the light receiving element group 33 of one detecting mechanism 48 changes from there being received light to there not being received light, the control portion 22 judges that the outermost light receiving element 32 in the width direction of the bill, among the light receiving elements 32 which do not receive light, has detected one end of the bill S in the width direction. Moreover, when the light receiving state of the light receiving element 32 of the light receiving element group 33 of the other detecting mechanism 48 changes from there being received light to there not being received light with respect to the same bill, the control portion 22 judges that the outermost light receiving element 32 in the width direction of the bill, among the light receiving elements 32 which do not receive light, has detected the other end of the bill S in the width direction. The control portion 22 judges the distance between the one end position and the other end position of the bill 5, that is, the width of the bill S, from the specified distance between the light receiving elements 32 furthest to the outer side in the width direction of the bill among the light receiving element 32 whose light receiving state has changed from there being received light to there not being received light, and thus determines the denomination. Also, the control portion 22 detects a conveyance fault of the bill S due to being askew or the like from a change in the light receiving state of the light receiving elements 32 of the light receiving element group 33 during detection of the same bill. Based on the detection result by the bill detector 30, the case of not being a denomination that can be judged as a match (or in the case of not matching the denomination that was designated in the display operation portion 21), and the case of a conveyance fault being detected shall be described. In these cases, the control portion 22 stops the feeding by the feeding mechanism 13 of the next bill S of the object bill S, and stops the driving of the guide roller 17 and the collection wheel 18 when the object bill S is fed to the accumulation portion 19, and performs an error display in the display operation portion 21.

Figure 7:
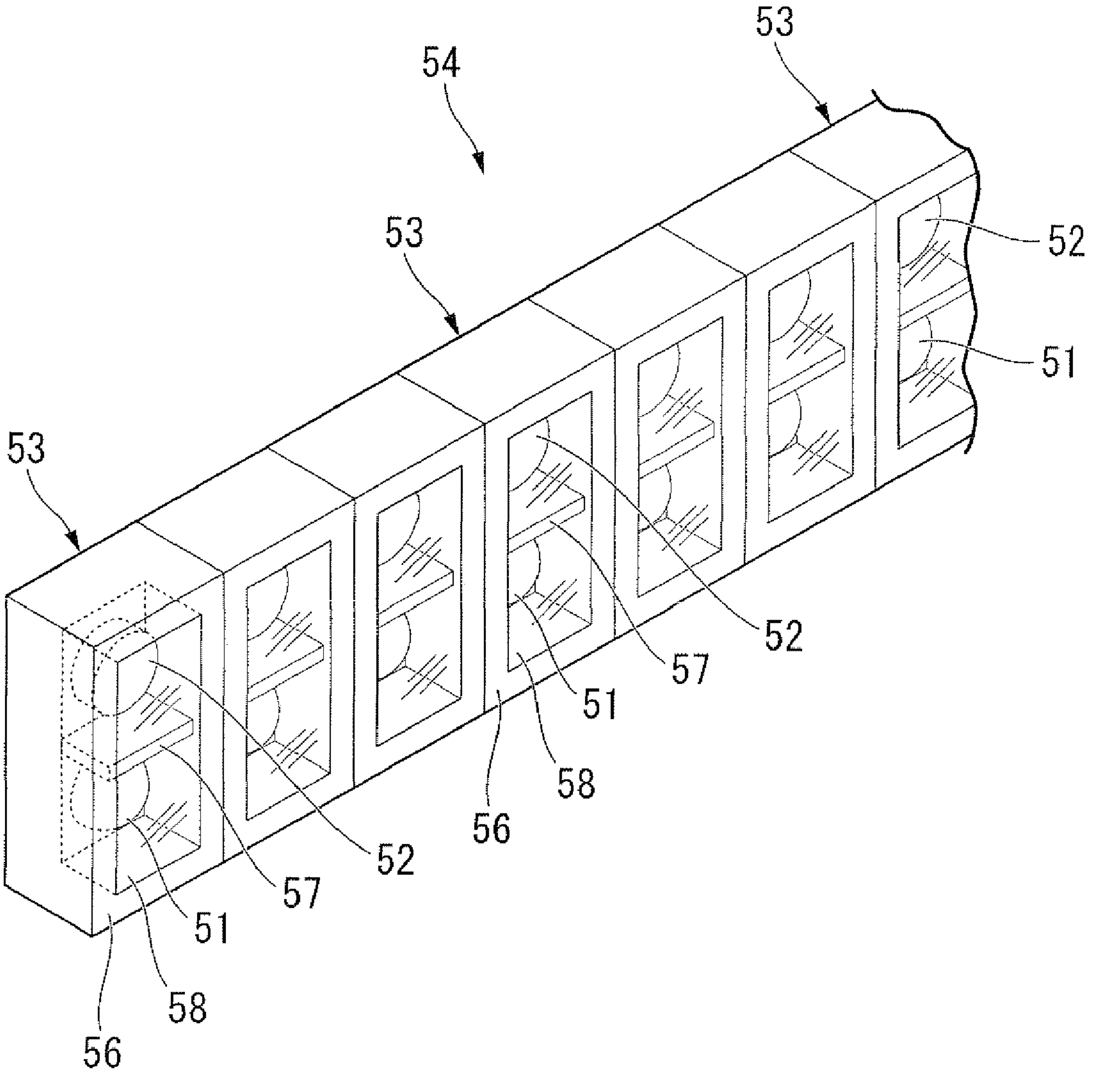
FIG. 7 is a perspective view that shows the sensor unit of the bill processing machine according to the embodiment of the present invention.
Figure 8:
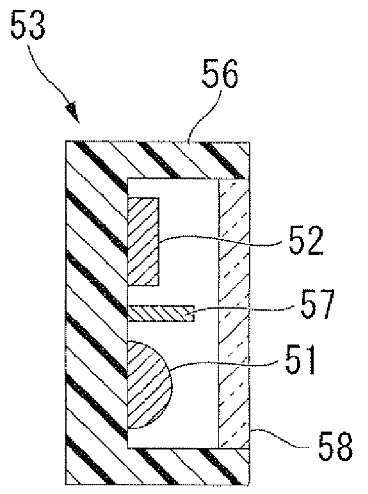
FIG. 8 is a cross-sectional view that shows a reflection sensor of the bill processing machine according to the embodiment of the present invention.

As shown in FIGS. 2 and 3, a bill pattern detector 50 is provided on the downstream side of the bill detector 30 of the identifying portion 27. The bill pattern detector 50 has a pair of sensor units 54 (hereinafter, sometimes referred to as a pair of a first sensor unit and a second sensor unit), as shown in FIGS. 2, 7, and 8. Each of a reflection sensor 53 includes a light emitting element (light source) 51 and a light receiving element 52. The sensor unit 54 is constituted by arranging a plurality of reflection sensors 53 in a line in a direction that is perpendicular to the arrangement direction of the light emitting element 51 and the light receiving element 52 in the state of the arrangement direction of the light emitting element 51 and the light receiving element 52 agreeing. That is, one reflection sensor (hereinafter, sometimes referred to as a first reflection sensor) 53 and other reflection sensor (hereinafter, sometimes referred to as a second reflection sensor) 53 are arranged in a line at different positions so that the placement relation of the light emitting element 51 and the light receiving element 52 of the first reflection sensor 53 and the placement relation of the light emitting element 51 and the light receiving element 52 of the second reflection sensor 54 agree.

As shown in FIGS. 7 and 8, as for the light emitting element 51 and the light receiving element 52, the direction other than the light emitting and receiving direction of the reflection sensor 53 is surrounded by the enclosure wall portion 56. Adjacent reflection sensors 53 are also divided by the enclosure wall portion 56. The light emitting element 51 and the light receiving element 52 in the reflection sensor 53 are also partitioned by a partition wall 57. A cover 58 that includes transparent material is attached to the opening side of the enclosure wall portion 56.

Figure 9:
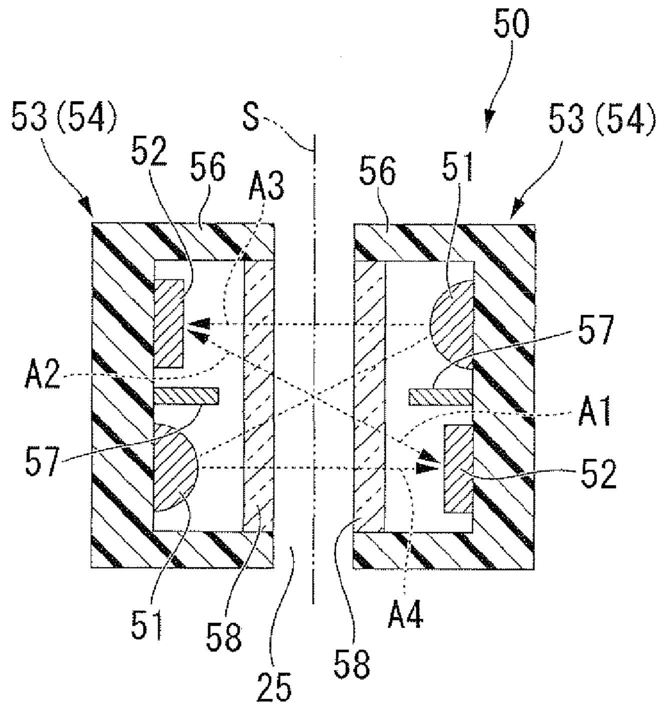
FIG. 9 is a cross-sectional view that shows the reflection sensors that are oppositely disposed of the bill processing machine according to the embodiment of the present invention.

Two sensor units 54 of the same structure are, as shown in FIG. 9, arranged sandwiching the conveyance path 25, with their phases mutually reversed, so that the light emitting element 51 of the one sensor unit 54 and the light receiving element 52 of the other sensor unit 54 are opposed, and the light receiving element 52 of the one sensor unit 54 and the light emitting element 51 of the other sensor unit 54 are opposed. That is, the pair of the first and second sensor units 54 are arranged sandwiching the conveyance path 52 of the bill S so that the light emitting elements 51 of the first and second reflection sensors 53 of the first sensor unit 54 and the light receiving elements 52 of the first and second reflection sensors 53 of the second sensor unit 54 are respectively opposed, and the light receiving elements 52 of the first and second reflection sensors 53 of the first sensor unit 54 and the light emitting elements 51 of the first and second reflection sensors of the second sensor unit 54 are respectively opposed.

Each reflection sensor 53 of the one sensor unit 54 causes the light emitting element 51 to emit light during detection and receives the reflected light from the bill S with the light receiving element 52 as shown by the dashed arrow A1 in FIG. 9, thereby detecting the reflected light of either one of the front face (first face) and the back face (second face) of the bill S. Each reflection sensor 53 of the other sensor unit 54 causes the light emitting element 51 to emit light during detection and receives the reflected light from the bill S with the light receiving element 52 as shown by the dashed arrow A2 in FIG. 9, thereby detecting the reflected light of the other of the front face and the back face of the bill S.

The opposing reflection sensors 53 detect the transmitted light in one direction (first direction) in the front-to-back direction by receiving with the light receiving element 52 of the other reflection sensor 53 the emitted light of the light emitting element 51 of the one reflection sensor 53 as shown by the dashed arrow A3 in FIG. 9. Also, the opposing reflection sensors 53 detect the transmitted light in the reverse direction (second direction) in the front-to-back direction by receiving with the light receiving element 52 of the one reflection sensor 53 the emitted light of the light emitting element 51 of the other reflection sensor 53 as shown by the dashed arrow A4 in FIG. 9.

One set of processes includes a first process, a second process and a third process. The first process is a process that detects in sequence the reflected light of one face of the front face and the back face of the bill S by the plurality of reflection sensors 53 of the one sensor unit 54. The second process is a process that detects in sequence the reflected light of the other face of the front face and the back face of the bill S by the plurality of reflection sensors 53 of the other sensor unit 54. The third process is a process that detects the transmitted light in the one direction of the bill S by the plurality of reflection sensors 53 of the one sensor unit 54 and detects the transmitted light in the other direction of the bill S by the plurality of reflection sensors 53 of the other sensor unit 54. The control portion 22 repeatedly performs this set of processes at every position in the conveyance direction of the bill S on the bill S that is being conveyed in the conveyance path 25, so as to detect the overall reflected light pattern and the transmitted light pattern of the bill S. In this one set of processes, the first process and the second process are performed simultaneously, and thereafter the third process is performed.

Specifically, in the first process, as the detection timing of each light receiving element 52 of the plurality of reflection sensors 53 of the one sensor unit 54, the control portion 22 performs detection in turn one at a time from the light receiving element 52 of the reflection sensor 53 at one end of the array to the light receiving element 52 of the reflection sensor 53 at the other end of the array. In the second process, the detection timing of each light receiving element 52 of the plurality of reflection sensors 53 of the other sensor unit 54 is shifted by detection timing of one reflection sensor 53 with respect to detection timing of the one sensor unit 54 in the first process. That is, in the second process, as the detection timing of each light receiving element 52 of the plurality of reflection sensors 53 of the other sensor unit 54, the control portion 22 performs detection in turn one at a time from the light receiving element 52 of the second reflection sensor 53 from the same one end of the array to the light receiving element 52 of the reflection sensor 53 of the other end, and finally detection is performed on the light receiving element 52 of the reflection sensor 53 of the one end of the array. In that case, the detection timing of each light receiving element 52 of the plurality of reflection sensors 53 of the one sensor unit 54 in the first process is made to agree with the detection timing of the light receiving element 52 of the reflection sensors 53 whose positions are adjacent in the arrangement direction of the other sensor unit 54 in the second process.

Figure 10A:
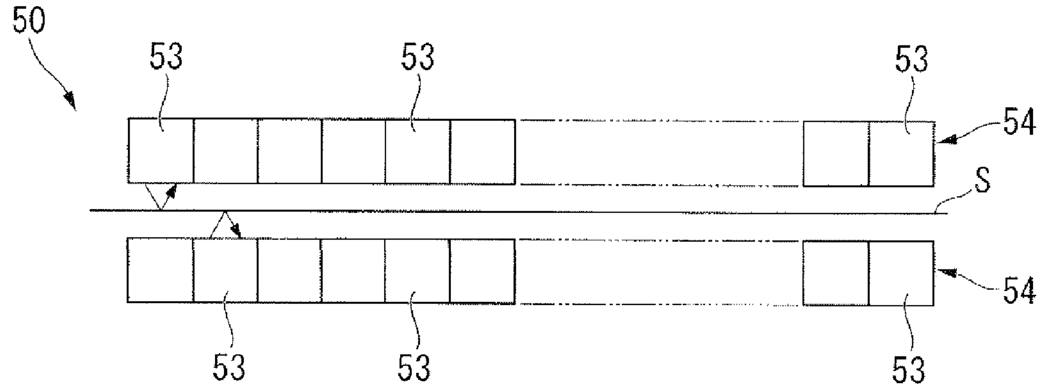
FIG. 10A is a schematic plan view for describing detection timing of the pair of sensor units of the bill processing machine according to the embodiment of the present invention.
Figure 10B:
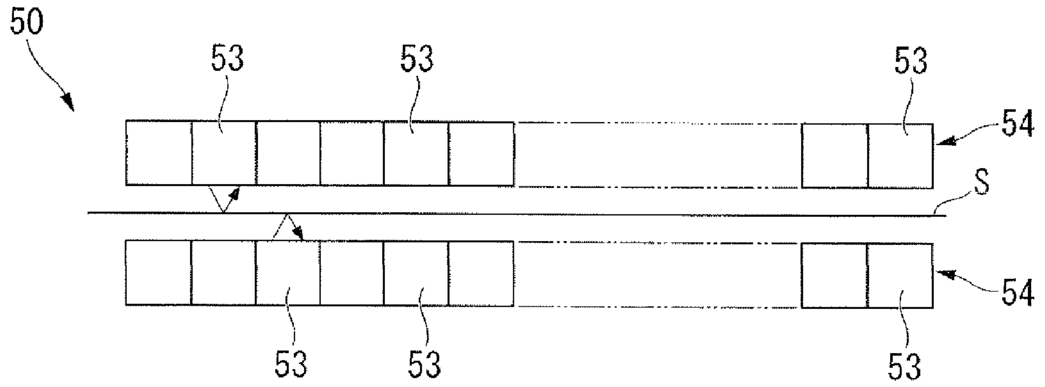
FIG. 10B is a schematic plan view for describing detection timing of the pair of sensor units of the bill processing machine according to the embodiment of the present invention.
Figure 10C:
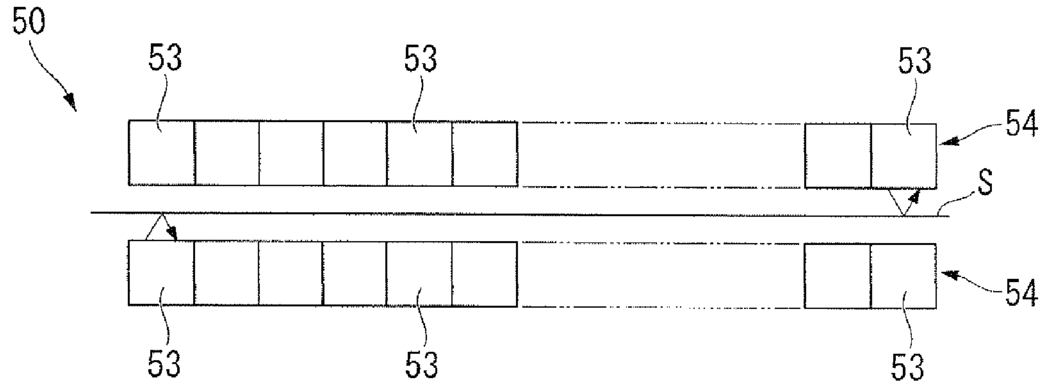
FIG. 10C is a schematic plan view for describing detection timing of the pair of sensor units of the bill processing machine according to the embodiment of the present invention.

That is, as the first process and the second process in the one set of processes, as shown in FIG. 10A, in the one sensor unit 54, light is emitted by the light emitting element 51 of the reflection sensor 53 of one end and light (first reflected light) is received by the light receiving element 52 of the reflection sensor 53 of the same one end, and simultaneously with this, in the other sensor unit 54 light is emitted by the light emitting element 51 of the second reflection sensor 53 from the same one end and light (fourth reflected light) is received by the light receiving element 52 of the second reflection sensor 53 from the same one end. Next, as shown in FIG. 10B, in the one sensor unit 54, light is emitted by the light emitting element 51 of the second reflection sensor 53 from the one end and light (second reflected light) is received by the light receiving element 52 of the second reflection sensor 53 from the same one end, and simultaneously with this, in the other sensor unit 54, light is emitted by the light emitting element 51 of the third reflection sensor 53 from the same one end and light (fifth reflected light) is received by the light receiving element 52 of the third reflection sensor 53 from the same one end. In this sequence, the light emitting element 51 emits light, and the light receiving element 52 receives light. Finally, as shown in FIG. 10C, in the one sensor unit 54, light is emitted by the light emitting element 51 of the reflection sensor 53 of the other end and light is received by the light receiving element 52 of the reflection sensor 53 of the same other end, and simultaneously with this, light is emitted by the light emitting element 51 of the reflection sensor 53 of the one end of the other sensor unit 54 and light (third reflected light) is received by the light receiving element 52 of the reflection sensor 53 of the same one end. Thereby, the first process and the second process in the one set of processes are completed.

In the third process, as the detection timing of each of the plurality of reflection sensors 53 of the one sensor unit 54, the control portion 22 performs detection in turn one at a time from the light receiving element 52 of the reflection sensor 53 of the one end of the array to the light receiving element 52 of the reflection sensor 53 of the other end. Moreover, in the third process, as the detection timing of each of the plurality of reflection sensors 53 of the other sensor unit 54, the control portion 22 performs detection in turn one at a time from the light receiving element 52 of the reflection sensor 53 of the one end of the array to the light receiving element 52 of the reflection sensor 53 of the other end of the array. In the third process, the individual detection timing of the receiving element 52 of the plurality of reflection sensors 53 of the one sensor unit 54 in the third process and the individual detection timing of the light receiving element 52 of the plurality of reflection sensors 53 of the other sensor unit 54 in the third process are alternated with each other.

Figure 11A:
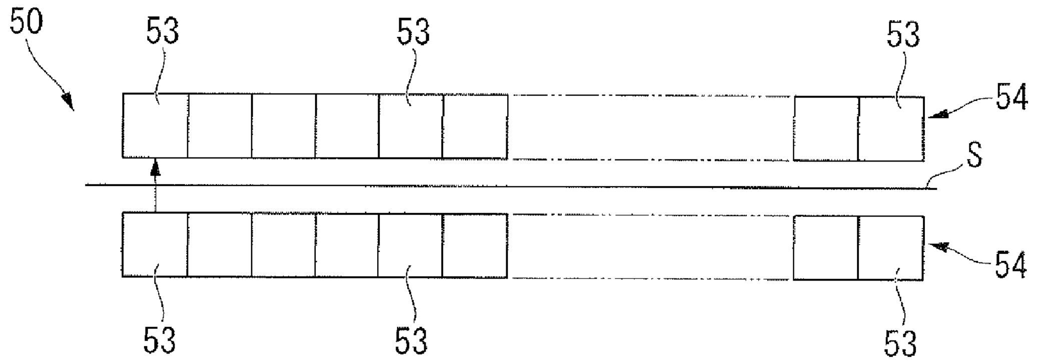
FIG. 11A is a schematic plan view for describing detection timing of the pair of sensor units of the bill processing machine according to the embodiment of the present invention.
Figure 11B:
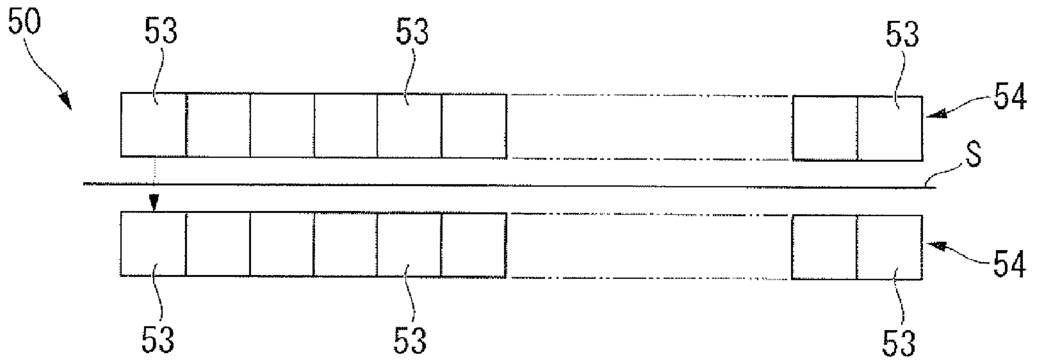
FIG. 11B is a schematic plan view for describing detection timing of the pair of sensor units of the bill processing machine according to the embodiment of the present invention.
Figure 11C:
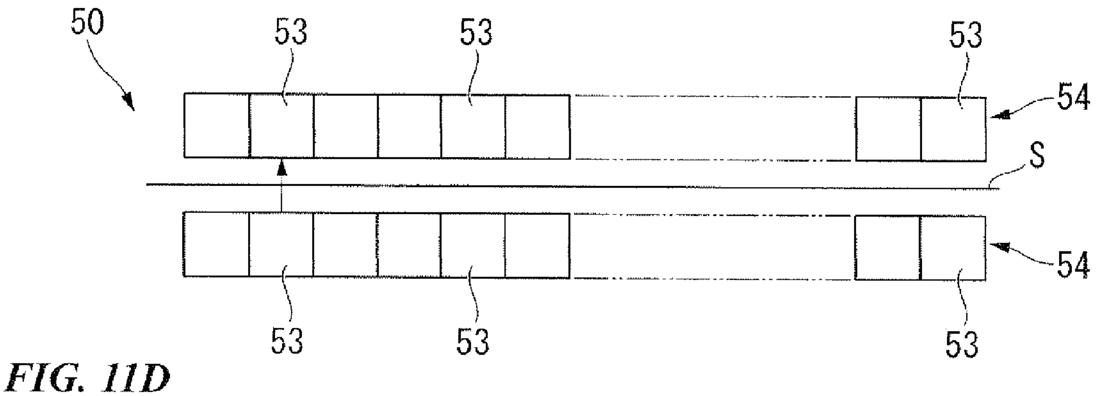
FIG. 11C is a schematic plan view for describing detection timing of the pair of sensor units of the bill processing machine according to the embodiment of the present invention.
Figure 11D:
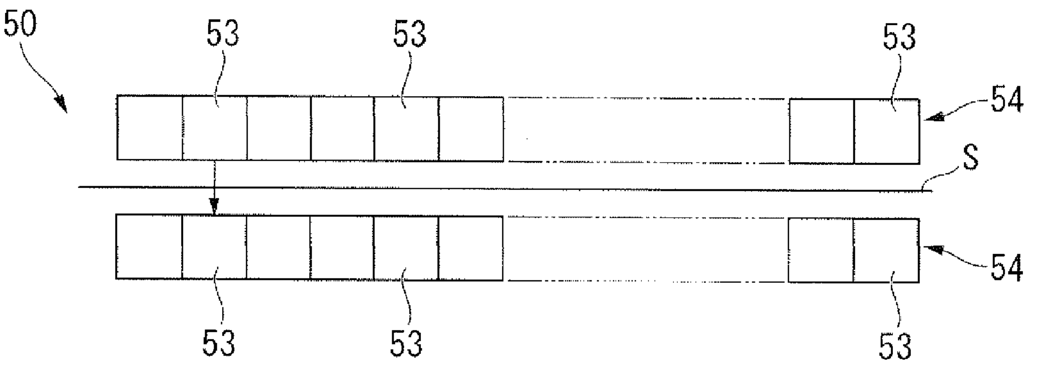
FIG. 11D is a schematic plan view for describing detection timing of the pair of sensor units of the bill processing machine according to the embodiment of the present invention.

That is, in the third process, as shown in FIG. 11A, light is emitted by the light emitting element 51 of the reflection sensor 53 of one end of the other sensor unit 54 and light (first transmitted light) is received by the light receiving element 52 of the reflection sensor 53 of the same one end of the one sensor unit 54. Next, as shown in FIG. 11B, light is emitted by the light emitting element 51 of the reflection sensor 53 of the same one end of the one sensor unit 54 and light (third transmitted light) is received by the light receiving element 52 of the reflection sensor 53 of the same one end of the other sensor unit 54. Next, as shown in FIG. 11C, light is emitted by the light emitting element 51 of the second reflection sensor 53 from the one end of the other sensor unit 54 and light (second transmitted light) is received by the light receiving element 52 of the second reflection sensor 53 from the same one end of the one sensor unit 54. Next, as shown in FIG. 11D, light is emitted the light emitting element 51 of the second reflection sensor 53 from the same one end of the one sensor unit 54 and light (fourth transmitted light) is received by the light receiving element 52 of the second reflection sensor 53 from the same one end of the other sensor unit 54. With this kind of sequence, light emitting is performed by the light emitting element 51, and light receiving is performed by the light receiving element 52. At the second from the last in the third process, light emitting is performed by the light emitting element 51 of the reflection sensor 53 of the other end of the other sensor unit 54 and light receiving is performed by the light receiving element 52 of the reflection sensor 53 of the same other end of the one sensor unit 54. At the last in the third process, light emitting is performed by the light emitting element 51 of the reflection sensor 53 of the same other end of the one sensor unit 54 and light receiving is performed by the light receiving element 52 of the reflection sensor 53 of the same other end of the other sensor unit 54. Thereby, the third process in the one set of processes is completed.

The control portion 22 adds or averages to/with the detection data of the individual positions in the arrangement direction of the plurality of reflection sensors 53 of the one sensor unit 54 in the third process the detection data of the reflection sensors 53 whose positions match in the arrangement direction of the other sensor unit 54 in the third process, and thereby obtains transmitted light data of the individual positions in the arrangement direction. That is, by adding or averaging the light receiving data in the light receiving element 52 of the reflection sensor 53 of the one end of the one sensor unit 54 when light emitting is performed by the light emitting element 51 of the reflection sensor 53 of the same one end of the other sensor unit 54 as shown in FIG. 11A, and the light receiving data that is performed by the light receiving element 52 of the reflection sensor 53 of the same one end of the other sensor unit 54 when light emitting is performed by the light emitting element 51 of the reflection sensor 53 of the same one end of the one sensor unit 54 as shown in FIG. 11B, the light receiving data of the one end is obtained. Moreover, by adding or averaging the light receiving data in the light receiving element 52 of the second reflection sensor 53 from the one end of the one sensor unit 54 when light emitting is performed by the light emitting element 51 of the second reflection sensor 53 from the same one end of the other sensor unit 54 as shown in FIG. 11C, and the light receiving data in the light receiving element 52 of the second reflection sensor 53 from the same one end of the other sensor unit 54 when light emitting is performed by the light emitting element 51 of the second reflection sensor 53 from the same one end of the one sensor unit 54 as shown in FIG. 11D, the second light receiving data from the one end is obtained. In this sequence, the light receiving data is thus obtained.

The control portion 22 compares the pattern data that is created by the reflected light data of one face of the front face and back face of the bill S that is obtained by the plurality of set processes with master data of both faces of the front face and back face of the denomination that is obtained by the bill detector 30 (or the denomination that is designated by the display operation portion 21), and the control portion 22 judges the degree of coincidence of the pattern data with the master data of one face having a higher degree of coincidence with the pattern data. Also, the control portion 22 judges the degree of coincidence of the pattern data that is created by the reflected light data of the other face of the front face and back face of the bill S that is obtained by the plurality of set processes with master data of the other face of the front face and back face of the same denomination. Moreover, the control portion 22 judges the degree of coincidence of the pattern data that is created by the transmitted light data of the bill S that is obtained by the plurality of set processes with the master data of the same denomination. In the case of all the degrees of coincidence being within a permissible range, the control portion 22 judges the object bill as a bill of the denomination that was obtained by the bill detector 30. On the other hand, in the case of any one of the degrees of coincidence not being within a permissible range, the control portion 22 does not judge the object bill as a bill of the denomination that was obtained by the bill detector 30, stops the feeding by the feeding mechanism 13 of the next bill of the object bill, and stops the driving of the guide roller 17 and the collection wheel 18 when the object bill is fed to the accumulation portion 19, and performs an error display on the display operation portion 21.

According to the bill processing machine 11 of the present embodiment described above, in the bill detector 30, the element array portion 31 is arranged so as to face one side of the conveyance path 25 of the bill S, and the light guiding member 40 is disposed opposite to the element array portion 31 with respect to the conveyance path 25 so that the conveyance path 25 is sandwiched between the element array portion 31 and the light guiding member 40. When the light emitting element 34 of the element array portion 31 emits light, the first refracting portion 42 of the light guiding member 40 refracts the irradiated light in a direction parallel to the arrangement direction of the light receiving elements 32 of the light receiving element group 33, and the main body portion 43 of the light guiding member 40 diffuses the light in an approximately uniform manner toward the light receiving element group 33, and so it is possible to detect the end portion position in the width direction of the bill S by the ON/OFF of the plurality of light receiving elements 32 that constitute the light receiving element group 33. Also, the second refracting portion 44 of the light guiding member 40 refracts the irradiated light that is refracted by the first refracting portion 42 toward the other side light receiving element 35, and so it is possible to detect the existence of the bill S by the ON/OFF of the other side light receiving element 35. With this structure, the light emitting element 34 and the light guiding member 40 become a common light source with respect to the plurality of light receiving elements 32 of the light receiving element group 33 and the other side light receiving element 35. Accordingly, since the light source for the plurality of light receiving elements 32 and the other side light receiving element 35 is constituted by one light emitting element 34 and light guiding member 40, it is possible to achieve simplification, cost reduction and space reduction. Moreover, since the light receiving element group 33, the light emitting element 34 and the other side light receiving element 35 are disposed on the element array portion 31 on one side of the conveyance path 25 of the bill S, the wiring for driving them is gathered together on one side of the conveyance path 25 (the machine body unit portion that does not swing). Therefore, the wiring for driving them is eliminated on the opposite side of the conveyance path 25 (the machine body unit portion that swings open and closed).

Accordingly, from this point as well, it is possible to achieve simplification, cost reduction and space reduction.

Also, the two sets of the detecting mechanism 48 that includes the element array portion 31 and the light guiding member 40 that are mutually opposed are arranged in the state of each other's other side light receiving element 35 being disposed on the proximal side. With this structure, it is possible to detect the one end position in the width direction of the bill S by the light receiving element group 33 of the one detecting mechanism 48, and detect the other end position in the width direction of the bill S by the light receiving element group 33 of the other detecting mechanism 48. Accordingly, it is possible to detect both end positions in the width direction of the bill S, and it is possible to perform a check of the conveyance state and a denomination confirmation and the like.

The two sets of the detecting mechanism 48 dispose each other's element array portion 31 on the same one side with respect to the conveyance path 25. With this structure, the wiring and the like for driving the light receiving element group 33, the light emitting element 34 and the other side light receiving element 35 of the two sets of the detecting mechanism 48 is gathered together on one side of the conveyance path 25 (the machine body unit portion that does not swing). Therefore, the wiring for driving them is eliminated on the opposite side of the conveyance path 25 (the machine body unit portion that swings open and closed). Accordingly, simplification, cost reduction and space reduction are achieved.

The control portion 22 detects the end portion position of the bill S based on the detection result of the light receiving element group 33, and judges the existence of the bill S based on the detection result of the other side light receiving element 35. With this structure, it is possible to judge the existence of the bill S and the end portion position.

The control portion 22 counts the bills S based on the detection result of the existence of the bill S by at least either one of the other side light receiving elements 35 of the two sets of the detecting mechanisms 48, and judges the width of the bill S and judges the denomination based on the detection result of the end portion position of the bill S by both light receiving element groups 33 of the two sets of the detecting mechanisms 48. With this structure, it is possible to judge the existence, width and denomination of the bill S.

In addition, according to the bill processing machine 11 of the present embodiment, the bill pattern detector 50 performs the first process, the second process, and the third process. The first process is a process that detects in sequence the reflected light of one face of the bill S by the plurality of reflection sensors 53 of the one sensor unit 54. The second process is a process that detects in sequence the reflected light of the other face of the bill S by the plurality of reflection sensors 53 of the other sensor unit 54. The third process detects the transmitted light in the one direction of the bill S by the plurality of reflection sensors 53 of the one sensor unit 54 and detects the transmitted light in the other direction of the bill S by the plurality of reflection sensors 53 of the other sensor unit 54. With this structure, even if the number of reflection sensors, that is, the number of pixels, is few, favorable recognition performance is obtained.

The individual detection timing of the plurality of reflection sensors 53 of the one sensor unit 54 in the first process and the detection timing of the reflection sensors 53 whose position differs in the arrangement direction of the other sensor unit 54 in the second process are made to agree. With this structure, it is possible to eliminate mutual effects and shorten the pattern reading time.

The individual detection timing of the plurality of reflection sensors 53 of the one sensor unit 54 in the first process is made to be the order of the arrangement, and the individual detection timing of the plurality of reflection sensors 53 of the other sensor unit 54 in the second process is made to the order of the arrangement shifted by one reflection sensor 53 with respect to the order of the arrangement of the one sensor unit 54. Moreover, the individual detection timing of the plurality of reflection sensors 53 of the one sensor unit 54 in the first process is made to agree with the detection timing of the reflection sensors 53 whose positions are adjacent in the arrangement direction of the other sensor unit 54 in the second process. With this constitution, it is possible to readily perform control.

The individual detection timing of the plurality of reflection sensors 53 of the one sensor unit 54 in the third process is made to be the order of the arrangement, and the individual detection timing of the plurality of reflection sensors 53 of the other sensor unit 54 in the third process is made to the order of the arrangement. Moreover, the individual detection timing of the plurality of reflection sensors 53 of the one sensor unit 54 in the third process and the individual detection timing of the plurality of reflection sensors 53 of the other sensor unit 54 in the third process are alternated between the one sensor unit 54 and the other sensor unit 54. For this reason, it is possible to readily perform control.

By adding or averaging to/with the detection data of the individual positions in the arrangement direction of the plurality of reflection sensors 53 of the one sensor unit 54 in the third process the detection data of the reflection sensors 53 of the other sensor unit 54 in the third process whose positions match in the arrangement direction, the transmitted light data of the individual positions in the arrangement direction is produced. With this structure, it is possible to suppress effects such as noise, and stabilize the transmitted light data.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A bill processing machine comprising:

an element array portion which is arranged so as to face one side of a conveyance path of a bill, and including a light receiving element group, a light emitting element and an other side light receiving element, the light receiving element group including a plurality of light receiving elements, an arrangement direction of the light receiving elements being perpendicular to a conveyance direction of a bill, the light receiving element group, light emitting element and the other side light receiving element being aligned along the arrangement direction of the light receiving elements, so that the light emitting element and the other side light receiving element sandwich the light receiving element group therebetween; and a light guiding member which is arranged opposite to the element array portion with respect to the conveyance path so that the light guiding member and the element array portion sandwich the conveyance path therebetween, the light guiding member including a first refracting portion, a second refracting portion and a main body portion, the first refracting portion being positioned to refract irradiated light of the light emitting element in a direction parallel to the arrangement direction, the second refracting portion being positioned to refract the irradiated light refracted by the first refracting portion toward the other side light receiving element, and the main body portion being constructed and positioned to substantially uniformly diffuse the irradiated light refracted by the first refracting portion toward the light receiving element group.

2. The bill processing machine according to claim 1, further comprising two sets of a detecting mechanism, each of the two sets of the detecting mechanism including the element array portion and the light guiding member that are mutually opposed, the two sets of the detecting mechanism being arranged in the arrangement direction so that the other side light receiving elements of the two sets of the detecting mechanism are arranged close to each other.

3. The bill processing machine according to claim 2, wherein in the two sets of the detecting mechanism, the element array portions of the two sets of the detecting mechanism are arranged on one side with respect to the conveyance path, and the light guiding members of the two sets of the detecting mechanism are arranged on the other side with respect to the conveyance path.

4. The bill processing machine according to claim 3, further comprising a control portion which detects an end of a bill based on a detection result of the light receiving element group, and which judges whether or not a bill exists based on a detection result of the other side light receiving element.

5. The bill processing machine according to claim 3, further comprising a control portion which counts a bill based on a detection result of whether or not a bill exists obtained by at least either one of the other side light receiving elements of the two sets of the detection mechanism, and which judges a width of a bill and a denomination of the bill based on a detection result of end portions of the bill obtained by both of the light receiving element groups of the two sets of the detection mechanism.

6. The bill processing machine according to claim 2, further comprising a control portion which detects an end of a bill based on a detection result of the light receiving element group, and which judges whether or not a bill exists based on a detection result of the other side light receiving element.

7. The bill processing machine according to claim 2, further comprising a control portion which counts a bill based on a detection result of whether or not a bill exists obtained by at least either one of the other side light receiving elements of the two sets of the detection mechanism, and which judges a width of a bill and a denomination of the bill based on a detection result of end portions of the bill obtained by both of the light receiving element groups of the two sets of the detection mechanism.

8. The bill processing machine according to claim 1, further comprising a control portion which detects an end of a bill based on a detection result of the light receiving element group, and which judges whether or not a bill exists based on a detection result of the other side light receiving element.

* * * * *